United States Patent [19]

Eckbreth et al.

[11] 3,863,103

[45] Jan. 28, 1975

[54] APPARATUS AND METHOD FOR ENHANCING POWER DEPOSITION IN CONVECTIVE ELECTRIC DISCHARGES

[75] Inventors: Alan C. Eckbreth, Glastonbury; Frank S. Owen, Vernon, both of Conn.

[73] Assignee: United Aircraft Corporation, East Hartford, Conn.

[22] Filed: Mar. 19, 1973

[21] Appl. No.: 342,914

[52] U.S. Cl.......... 315/111.2, 313/231.3, 313/231.6, 313/309, 331/94.5 G
[51] Int. Cl. ............................................. H05h 1/00
[58] Field of Search ............... 331/94.5 G, 94.5 PE; 313/231, 309, 204, 231.3, 231.6; 315/111, 111.2

[56] References Cited
UNITED STATES PATENTS

| | | | |
|---|---|---|---|
| 3,633,125 | 1/1972 | Whitehouse | 331/94.5 G |
| 3,671,882 | 6/1972 | Cool | 331/94.5 G |
| 3,735,284 | 5/1973 | Hill | 331/94.5 G |

Primary Examiner—Palmer C. Demeo
Attorney, Agent, or Firm—Anthony J. Criso

[57] ABSTRACT

A method and apparatus for enhancing the amount of electrical power which can be uniformly deposited in a flowing gas are disclosed. The systems involve the use of a baffle array upstream of the discharge region to suitably alter the velocity distribution of the gas stream prior to the deposition of electrical power to compensate for the velocity nonuniformities occurring in the flow during the power deposition process. The velocity profile across the gas stream in the discharge region is more uniform with an optimized baffle array and the amount of power is increased accordingly. The invention is discussed in terms of an embodiment having four rotatable baffles each having a precise orientation with respect to the flow which is determined empirically. The invention herein described was made in the course of or under a contract or subcontract thereunder with the Department of the Navy.

4 Claims, 4 Drawing Figures

3,863,103

APPARATUS AND METHOD FOR ENHANCING POWER DEPOSITION IN CONVECTIVE ELECTRIC DISCHARGES

BACKGROUND OF THE INVENTION

1. Field of Invention

The present invention relates to the maintenance of an electric discharge in a moving gas stream and more particularly to apparatus and method for enhancing the amount of electric power transferred uniformly throughout the bulk of the moving gas.

2. Description of the Prior Art

In a flowing gas laser system which is excited with an electric discharge, the total power of the output radiation is directly related to the amount of electrical power which can be transferred to the gaseous working medium. The trend of the development being made on existing laser systems is to higher power. In a typical laser system the electric power must be transferred to the entire gas volume of interest in as uniform a manner as possible. The rate at which electrical energy can be uniformly transferred to the gas is subject to a delicate upper limit which is determined essentially by the power density in localized regions of the discharge. For example, if the density of the power in a local region becomes too great, the temperature of the gas supporting the discharge increases in an amount which is detrimental to the necessary population inversion in the vibrational energy levels of the gas. The condition has been explained in the open literature in terms of E (electric field) and N (neutral particle population density). When the magnitude of the ratio of E to N is low, much of the electrical power goes into a heating of the gas and a populating of the lower laser energy levels and little energy goes into vibrational excitation; the overall condition is generally detrimental to laser action. Conversely, as the magnitude of the ratio of E to N is increased a much higher percentage of the electrical excitation energy goes directly into vibrational excitation of the gas and a smaller percentage of the electrical energy goes into heating the gas. Many lasers must operate with the gas excitation function occurring as a glow mode electric discharge, a condition described by a high ratio of E to N, to obtain sufficient vibrational excitation. Repeated attempts have been made to increase the laser output from a given system by such obvious expedients as simply increasing the electrical pumping power. As a practical matter, such efforts are generally unsatisfactory since the increased power deposition causes the discharge to become unstable and constrict into an arc. When the amount of electrical power transferred to the gas is in fact increased, the total population inversion is reduced because less of the electrical energy appears in the vibrational state of the gas. An arc is characterized by a low E to N ratio and is a condition providing no excitation of the upper vibrational energy levels, concomitant with thermal bottlenecking of the lower energy levels, due to thermal heating of a small volume in the discharge region.

SUMMARY OF THE INVENTION

An object of the present invention is to increase the amount of electrical power which can be uniformly deposited throughout the volume of a flowing gas in a glow mode discharge. Another object is to increase the power of the output radiation from a gas laser by conditioning the gas flow through an electric discharge with suitable velocity profile control.

The present invention is predicated on recognizing that the velocity distribution in a gas flowing through a conduit in which electric power is deposited in the gas, can be critical to the conditions under which the deposition occurs. We have discovered that in a gas laser which is being driven up to or near the thermal limit, a substantially uniform deposition of electrical power throughout the entire volume of a flowing gas stream does not occur unless a suitable temperature profile is maintained in the volume. We now recognize that a temperature profile suitable for optimizing the deposition of electric power in a moving gas may be achieved in the discharge region with appropriate preconditioning of the gas velocity profile upstream of the deposition region.

According to the present invention a baffle configuration is introduced into a conduit in which the deposition of electrical energy in a flowing gas takes place, the baffle configuration being located upstream of the discharge region to create a suitable velocity distribution to minimize the degree of localized concentrations of power deposition in the gas, to compensate for variations in the temperature across the stream, and to generate stream properties that increase the rate at which stream nonuniformities decay.

A primary advantage of the present invention is the increased uniformity with which the deposition of electric power in a flowing gas by discharge means is accomplished. In addition, the amount of power that can be transferred to the gas while maintaining a substantially uniform deposition rate throughout the entire volume is substantially increased. Additionally, existing electric discharge systems can be modified by the addition of baffles in accordance with the present invention to enhance the operation of such systems without significantly disturbing the basic arrangement.

A primary feature of the present invention is that the onset of constriction in the glow mode discharge occurs at higher operating powers than previously possible. Another feature is the presence of a baffle arrangement upstream of the electric discharge region in a flowing gas laser system. The baffle arrangement introduces little pressure drop into the system, and a substantially uniform velocity profile exists in the discharge region during normal discharge operation. The velocity profile is controlled generally by independently rotatable baffles which are often perforated. As a first approximation the number of baffles used in a particular channel is equal to one-half the height of the channel expressed in centimeters. The present invention is applicable to flow channels having various geometries and various types of electric discharges in either open or closed cycle systems. The velocity distribution provided in accordance with the present invention is produced with a baffle and the actual baffle orientation with respect to the direction of flow of the gas can be critical although perforations in each individual baffle can reduce the criticality of alignment.

The foregoing objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
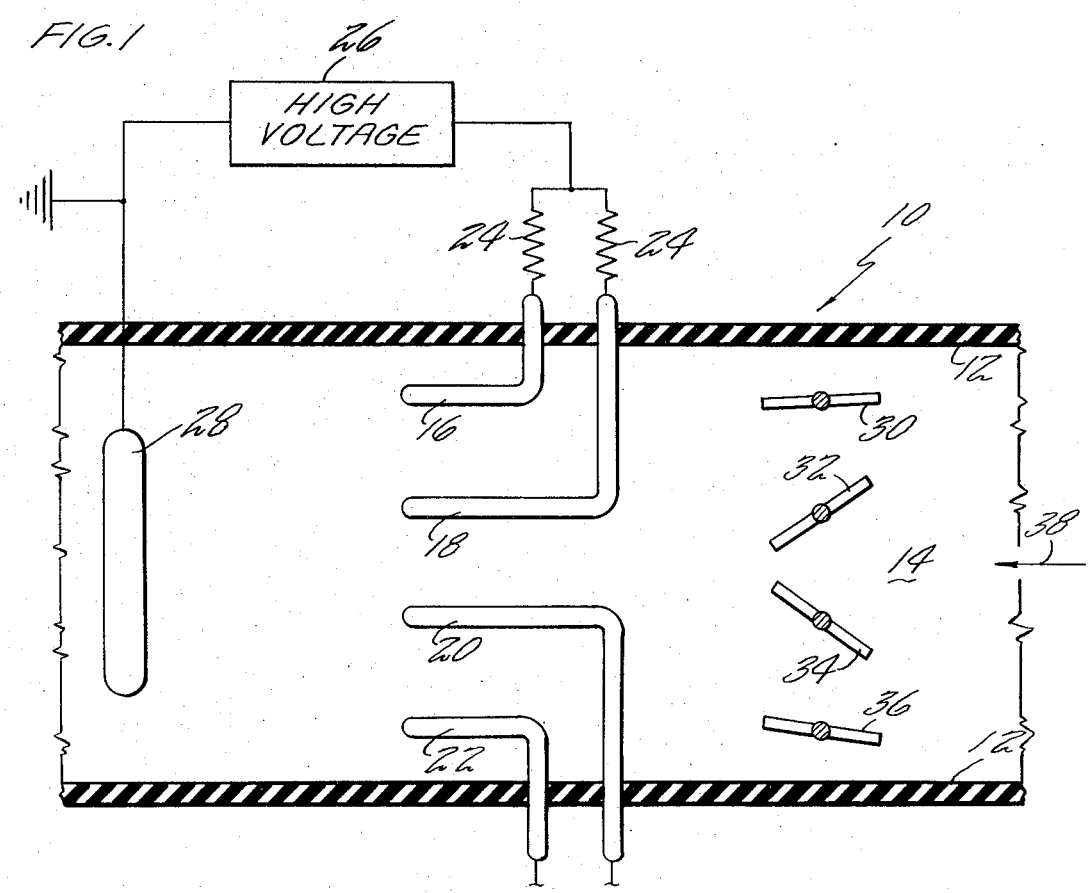
FIG. 1 is a simplified schematic of a gas flow channel having pin electrodes upstream and bar electrodes downstream and four rotatable baffles for velocity control in accordance with the present invention.

In order to achieve stable operation of a glow or abnormal glow-mode electric discharge in a flowing gas laser operated near the thermal limit, that is the operating gas temperature above which the laser efficiency drops drastically, precise control of the velocity distribution of the gas throughout the discharge is essential. A glow mode discharge is one in which the average electron energy is approximately one electron volt in the positive column of the discharge, and the electrons are emitted from the cathode due to ion bombardment. Both normal and abnormal glow mode discharges behave similarly in the positive column region and are distinguishable by the behavior of the current density at the cathode. In a normal glow, the current density at the cathode is independent of the total current; an increase in total current is accompanied by an increase in the emitting area at the cathode. In an abnormal glow, the cathode area is limited and an increase in current is accompanied by an increase in current density. The spatial and electrical stabilities of an established uniform electric discharge are extremely sensitive to variations in the temperature of the gas within local regions of the discharge plasma. An increase in the gas temperature in a local region of the plasma is generally accompanied by a decrease in the density of the gas in that region, the latter causing a concomitant increase in the electrical conductivity throughout the local region. Under these conditions, the electric power source which supports the discharge plasma maintains an essentially constant potential across a gas having a substantially uniform conductivity, that includes a local region of enhanced conductivity. Since the current tends to flow through the path having the enhanced conductivity, the current density and resulting joule heating in the local region both increase. Overall, an initial local temperature rise leads to increased joule heating which in turn causes an additional temperature rise. The sequence describes a runaway condition which quickly converts a uniform discharge of the glow mode type to a concentrated discharge in which most of the current is carried by a limited portion of the available gas volume in the form of a hot, high current density arc.

A nonuniform velocity distribution in a gas passing through a discharge region in a channel can produce a temperature variation in the gas which is sufficient to initiate the runaway condition described above. The presence of a velocity nonuniformity indicates that a nonuniform mass flow rate condition exists in the bulk of the stream of flowing gas and the gas having a lower than average velocity spends more time in the discharge region than does the gas having a higher velocity. Therefore, a greater temperature rise is experienced by the low velocity gases. Obviously, a temperature rise due to any cause can result in the collapse of the uniformly distributed plasma into a constricted, arc like, discharge if local temperature excursions and the concomitant electrical conductivity enhancements are not eliminated.

A typical embodiment of an electric discharge device constructed in accordance with the present invention is shown in FIG. 1. A rectangular duct 10 having side walls 12 forms a flow passage 14. Four-pin electrodes 16, 18, 20 and 22, penetrate the side walls 12 and are connected in electrical parallel through stabilizing resistors 24 to a source 26 of high voltage; the pin electrodes 20, 22 are connected in a similar manner to the high voltage source although the details are not shown in FIG. 1. A bar electrode 28 is maintained downstream of the pin electrodes at ground electric potential, and four baffles 30, 32, 34, 36 are rotatably mounted in the duct upstream of the electrodes 16–22.

In the operation of the device shown in FIG. 1, a suitable gas such as a mixture of carbon dioxide, nitrogen and helium is flowed through the duct in a direction 38. The presence of the pin electrodes in the gas stream induces perturbations in the velocity profile of the gas stream, the perturbations occurring immediately adjacent to the pin electrodes and extending in the downstream direction. These perturbations can include regions of low gas velocity. The baffles induce a velocity disturbance which interacts with and compensates for the velocity disturbance produced by the pin electrodes, and the net result is a substantially uniform velocity profile throughout the discharge region. Although the discharge system shown in FIG. 1 contains only four electrode pins, each electrode may be representative of a row of electrodes depending on the width of the actual channel. Also, other electrode configurations are used. As a practical matter the baffles are adjusted during the actual operation of the discharge in order to maximize the amount of power deposition in the gas. A more detailed discussion is provided by Eckbreth, A. C. et al., Flow Conditioning in Electric Discharge Convection Lasers, The Review of Scientific Instruments, Vol. 43, No. 7, p. 995, July, 1972.

Figure 2:
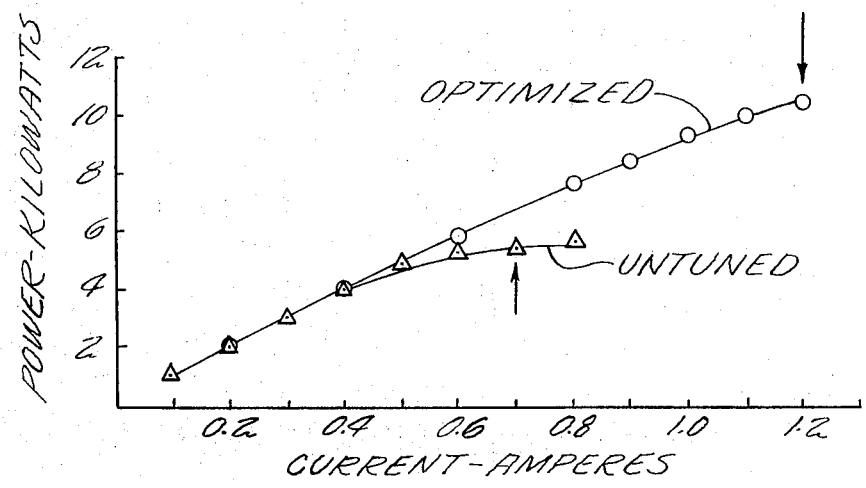
FIG. 2 is a plot of the electric power deposition as a function of current in a discharge system for both the optimized baffle configuration and an untuned baffle configuration.

The optical operating characteristics for a system such as the one shown in FIG. 1 are provided in FIG. 2 which shows the total electrical power in kilowatts transferred to the gas by the electric discharge maintained between the pin electrodes and the bar electrodes as a function of the current supplied to the electrodes. The apparatus from which these data are derived has a flow channel that is 7½ centimeters high and 15 centimeters wide with a 46 centimeter separation between the pin electrodes and the grounded electrode. Each stabilizing resistor has a typical impedance of N kilo ohms where N is the number of electrodes. The gas passed through the duct was a mixture of 5 percent carbon dioxide, 35 percent nitrogen and 60 percent helium having a velocity of approximately 65 meters per second. The gas pressure was essentially 40 torr, and four baffles each having a thickness of threetenths of a centimeter were used to control the velocity profile upstream of the electrodes.

Several studies have been completed in an attempt to develop a theoretical relationship between the behavior of the electrical discharge and the orientation of the baffles. The interaction between the baffles and the flow is evidently complex and the degree of complexity increases with the number of baffles; the precise phenomenon occurring is not fully understood. When the baffles in the channel were iteratively adjusted to establish the array which allowed the maximum discharge power to be dissipated in the gas without the plasma collapsing into an arc, the condition shown in FIG. 2 as the optimized curve resulted. These data show that the maximum power achievable with tuned baffles is approximately twice the maximum power dissipation allowable in the same channel having an untuned baffle configuration. The operating characteristics of an untuned channel are somewhat representative of a discharge in the same channel having no baffles at all. The arrows at approximately seven-tenths of an ampere in the untuned configuration and 1 2/10 amperes in the optimized configuration indicate those points in the operation at which the discharge attached to the bar electrode and was constricted in the upstream direction a distance equal to one-half of the total discharge length.

For the discharge apparatus shown schematically in FIG. 1, operating with the physical parameters stated above, the turbulence level at the inlet was observed to be between ½ and 1 percent. As used herein, turbulence level is defined as the magnitude of the velocity fluctuations in a given velocity profile expressed as a percent of the mean velocity; the inlet is a location upstream of the baffles and separated from the pin electrodes by four channel heights. With the inlet turbulence level within the range indicated, a velocity profile of the gas flowing through the discharge region was found to be uniform to within 4 percent. These conditions existed when the optimized power data shown in FIG. 2 were recorded.

Figure 3A:
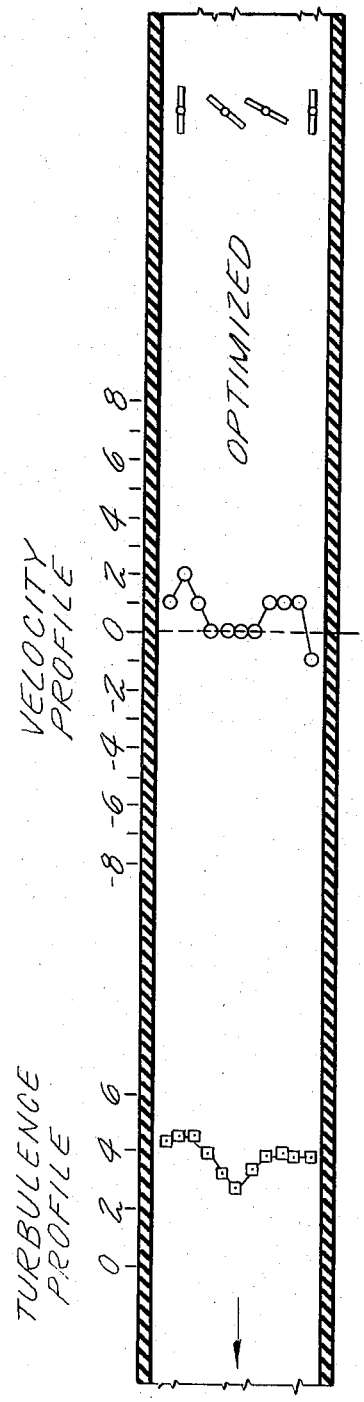
FIG. 3a is a plot of the turbulence and velocity profiles in a flow channel having the optimized baffle configuration corresponding to the performance conditions shown in FIG. 2.
Figure 3B:
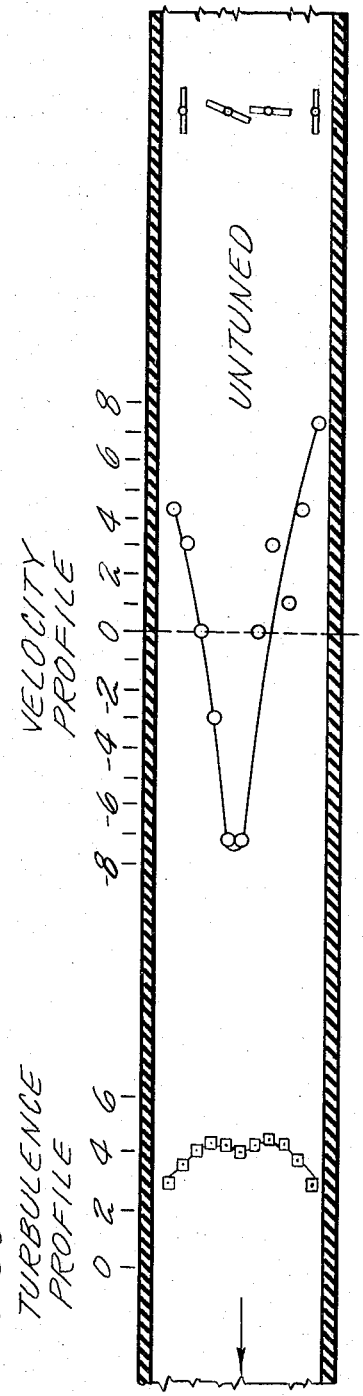
FIG. 3b is a plot of the turbulence and velocity profiles in a flow channel having untuned baffles corresponding to the performance condition shown in FIG. 2.

FIGS. 3a and 3b show the turbulence level and velocity profile in the discharge region for both the optimized and untuned conditions under which the data shown in FIG. 2 were taken. The turbulence levels in the discharge region are between 3 and 4 percent for both the optimized and untuned baffle configurations indicating that the baffles introduce turbulence into the gas stream. The spread in range of the discharge turbulence levels is about the same as the spread of the turbulence at the inlet although the absolute magnitude of the latter is lower. Perhaps most importantly is the readily discernible contrast in the velocity profiles for the optimized and untuned baffle configurations. In the optimum arrangement, the velocity profile varies less than three percent across the full width of the channels as compared with a velocity variation in excess of 10 percent for the untuned geometry.

The orientation of the baffles which provide the optimized discharge performance provides some insight into their function. As is shown in FIG. 3a, the baffles nearest the walls are tuned nearly flat and those immediately adjacent to the centerline of the duct are almost perpendicular to the direction of flow. One explanation for the relative baffle positioning is that in addition to introducing turbulence into the flow, the baffles compensate for the nonuniform flow impedance introduced by the pin electrodes and result in a nearly uniform velocity profile downstream of the electrodes in the discharge region. The optimum baffle orientation has been found to be a function of the pin electrode distribution across the channel. For example, when the elements are closely distributed about the channel centerline, the optimum baffle configuration is reversed and the baffles adjacent to the centerline must be turned parallel to the flow and the baffles nearest the wall are approximately perpendicular to the flow. The discharge performance is very sensitive to the orientation of the baffles which must be aligned to within a few degrees of optimum and therefore the adjustment of the baffles during operation of the discharge is essential to good discharge characteristics. The precision with which the baffles must be aligned for optimum performance is reduced by forming each baffle with a porosity of approximately 10 to 15 percent. Generally the pressure ratio in a given system is increased by less than 25 percent when perforated baffles are located upstream of the discharge region.

The theory of drag coefficients does not predict the radically different baffle orientations which have been found to be optimum for the conditions just described. The portion of each pin electrode which is perpendicular to the direction of the gas flow should have the greatest drag since the portion of the electrodes which is parallel to the direction of flow introduces drag only by skin friction. Therefore, from a dimensional consideration the baffle orientation should be independent of electrode row spacing, however, since the baffle orientation and electrode spacing have been found to be related the explanation appears to be that the flow is two dimensional. The flow field of the gas around the baffles aligned perpendicular to the direction of flow is known to be complex, involving interacting vortex streets, the degree of interaction depending somewhat on the porosity of the baffles.

Although this invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. In an electric discharge apparatus having a conduit in which a substantially uniform plasma can be established in a stream of gas flowing through a discharge region within the conduit the improvement comprising:
    a baffle array comprising a plurality of individually rotatable baffle plates located in the conduit and upstream of the discharge region to cause blockage to the localized regions in the flowing stream and thereby produce a substantially uniform velocity profile across the gas stream in the discharge region.

2. The invention according to claim 1 wherein the baffle plates have a porosity in the range of 5 to 20 percent.

3. In an electric discharge apparatus capable of maintaining a uniform glow mode plasma in a gas flowed through a discharge region therein, the improvement for increasing the amount of electrical power deposition in the gas without the discharge collapsing into an arc comprising:

a baffle element rotatably mounted in the gas flow upstream of the discharge region and having a porosity between 5 and 15 percent.

4. In a stream of flowing laser gas which is subjected to an electric discharge in a duct having no impediments to gas flow in the electric discharge, the method of maintaining a substantially uniform velocity profile across the gas throughout the region of the discharge including the steps of:

flowing the gas into the duct with a substantially uniform velocity profile;

establishing the electric discharge across the gas in the discharge region of the duct; and introducing select velocity perturbations to localized regions in the flowing gas at a station upstream of the discharge region to compensate for velocity perturbations which occur in the gas while passing through the discharge region.

* * * * *